(12) United States Patent
Zheng

(10) Patent No.: US 11,212,253 B2
(45) Date of Patent: Dec. 28, 2021

(54) USER EQUIPMENT MANAGEMENT METHOD AND APPARATUS

(71) Applicant: Huawei Technologies Co., Ltd., Shenzhen (CN)

(72) Inventor: Ruobin Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 167 days.

(21) Appl. No.: 16/420,897

(22) Filed: May 23, 2019

(65) Prior Publication Data

US 2019/0281019 A1 Sep. 12, 2019

Related U.S. Application Data

(63) Continuation of application No. PCT/CN2017/108382, filed on Oct. 30, 2017.

(30) Foreign Application Priority Data

Nov. 24, 2016 (CN) .......................... 201611051215.1

(51) Int. Cl.
*H04L 29/06* (2006.01)
*H04L 29/08* (2006.01)
*H04L 12/28* (2006.01)

(52) U.S. Cl.
CPC .............. *H04L 63/02* (2013.01); *H04L 12/28* (2013.01); *H04L 29/06* (2013.01); *H04L 29/08* (2013.01);
(Continued)

(58) Field of Classification Search
CPC ..... H04L 63/02; H04L 63/0876; H04L 67/16; H04W 48/16; H04W 88/16
See application file for complete search history.

(56) References Cited

U.S. PATENT DOCUMENTS 8,832,855 B1 9/2014 Enderwick et al.
9,923,881 B2 * 3/2018 Smith ....................... H04L 9/14
(Continued)

FOREIGN PATENT DOCUMENTS

CN 101068268 A 11/2007
CN 101471899 A 7/2009
(Continued)

OTHER PUBLICATIONS

"Identity and Access Management for the Internet of Things"—IoT Working Group, Cloud Security Alliance, Aug. 2016 https://downloads.cloudsecurityalliance.org/assets/research/internet-of-things/identity-and-access-management-for-the-iot.pdf (Year: 2016).*
(Continued)

*Primary Examiner* — Randy A Scott
(74) *Attorney, Agent, or Firm* — Slater Matsil, LLP

(57) ABSTRACT

This application provides a user equipment management method and a device, to help reduce complexity of operation and maintenance. The method includes: obtaining, by a gateway device, identifiers IDs of N user equipments and information about a first service, where the N user equipments are terminals configured to implement the first service, and N is an integer greater than or equal to 1; obtaining, by the gateway device, an ID of a logical device based on the information about the first service, where the logical device is a set of logical elements that are in the gateway device and that are configured to implement the first service; and binding, by the gateway device, the ID of the logical device and the IDs of the N user equipments.

14 Claims, 6 Drawing Sheets

(52) U.S. Cl.
CPC .......... *H04L 63/0876* (2013.01); *H04L 67/12* (2013.01); *H04L 67/16* (2013.01)

(56) References Cited

U.S. PATENT DOCUMENTS

| | | | | |
|---|---|---|---|---|
| 2015/0381429 | A1* | 12/2015 | Wu | H04L 41/12 709/223 |
| 2016/0337948 | A1* | 11/2016 | Yin | H04L 41/0856 |
| 2018/0077067 | A1* | 3/2018 | Dowlatkhah | H04L 12/2834 |

FOREIGN PATENT DOCUMENTS

| | | | |
|---|---|---|---|
| CN | 101527893 | A | 9/2009 |
| CN | 203119923 | U | 8/2013 |
| CN | 103455698 | A | 12/2013 |
| CN | 103905571 | A | 7/2014 |
| CN | 104836708 | A | 8/2015 |
| CN | 105471686 | A | 4/2016 |
| CN | 105635143 | A | 6/2016 |
| CN | 105992306 | A * | 10/2016 |
| EP | 2903321 | A1 | 8/2015 |
| WO | 2011072429 | A1 | 6/2011 |
| WO | 2016070064 | A1 | 5/2016 |
| WO | 2016131297 | A1 | 8/2016 |

OTHER PUBLICATIONS

"Security Guidance for Early Adopters of the Internet of Things"—Mobile Working Group, Cloud Security Alliance, Apr. 2015 https://downloads.cloudsecurityalliance.org/whitepapers/Security_Guidance_for_Early_Adopters_of_the_Internet_of_Things.pdf (Year: 2015).*

* cited by examiner

USER EQUIPMENT MANAGEMENT METHOD AND APPARATUS

CROSS-REFERENCE TO RELATED APPLICATIONS

This application is a continuation of International Application No. PCT/CN2017/108382, filed on Oct. 30, 2017, which claims priority to Chinese Patent Application No. 201611051215.1, filed on Nov. 24, 2016. The disclosures of the aforementioned applications are hereby incorporated herein by reference in their entireties.

TECHNICAL FIELD

This application relates to the communications field, and in particular, to a user equipment management method and an apparatus.

BACKGROUND

The Internet of Things (IoT) is a network that is based on an information bearer such as the Internet or a conventional telecommunication network and that implements interworking between physical objects that are individually addressable. The IoT can collect, in real time by using various sensing devices, information about an object or a process requiring to be monitored, connected to, or interacted with. Currently, the sensing devices in the IoT are provided by different vendors and cannot be shared. Consequently, in a process in which the IoT implements a plurality of services of a user, a service provider needs to authenticate and manage sensing devices used by the services provided by the service provider. Each service provider needs to deploy, based on services, dedicated management devices for sensing devices provided by vendors. This increases complexity of operation and maintenance.

SUMMARY

Embodiments of this application provide a user equipment management method and an apparatus, to help reduce complexity of operation and maintenance.

According to a first aspect, a user equipment management method is provided. The method includes obtaining, by a gateway device, identifiers IDs of N user equipments and information about a first service, where the N user equipments are terminals configured to implement the first service, and N is an integer greater than or equal to 1, obtaining, by the gateway device, an ID of a logical device based on the information about the first service, and binding, by the gateway device, the ID of the logical device and the IDs of the N user equipments, where the logical device is a set of logical elements that are in the gateway device and that are configured to implement the first service.

The logical device is configured to manage the N user equipments. One logical element in the logical device is configured to manage at least one of the N user equipments. The binding, by the gateway device, the ID of the logical device and the IDs of the N user equipments includes: storing, by the gateway device, a correspondence between the ID of the logical device and the IDs of the N user equipments.

Optionally, the obtaining, by a gateway device, identifiers IDs of N user equipments and information about a first service includes: receiving, by the gateway device, a first correspondence sent by a terminal device, where the first correspondence includes the IDs of the N user equipments and the information about the first service, and the IDs of the N user equipments are obtained by the terminal device by identifying the N user equipments; and obtaining, by the gateway device, the IDs of the N user equipments and the information about the first service from the first correspondence.

Optionally, the obtaining, by a gateway device, identifiers IDs of N user equipments and information about a first service includes: receiving, by the gateway device, the IDs of the N user equipments sent by the N user equipments respectively; sending, by the gateway device, the IDs of the N user equipments to a terminal device; receiving, by the gateway device, a first correspondence sent by the terminal device, where the first correspondence includes the IDs of the N user equipments and the information about the first service; and obtaining, by the gateway device, the IDs of the N user equipments and the information about the first service from the first correspondence.

In the foregoing method, the first correspondence is obtained by the terminal device after a user adds the N user equipments to the first service on the terminal device. Through the process in which the user adds the N user equipments to the first service, the terminal device completes authentication on the N user equipments. To be specific, the user adds the N user equipments trusted by the user to the first service by using the terminal device.

Optionally, the obtaining, by the gateway device, an ID of a logical device based on the information about the first service includes: obtaining, by the gateway device, the ID of the logical device based on a second correspondence and the information about the first service, where the second correspondence includes the information about the first service and the ID of the logical device.

Optionally, the obtaining, by the gateway device, an ID of a logical device based on the information about the first service includes: generating, by the gateway device, the ID of the logical device based on the information about the first service and a preset algorithm. The preset algorithm may be a digest algorithm or a hash algorithm.

Optionally, the binding, by the gateway device, the ID of the logical device and the IDs of the N user equipments includes: sending, by the gateway device, identity authentication information, the ID of the logical device, and the IDs of the N user equipments to an authentication server, where the identity authentication information is used to authenticate validity of the logical device, and the identity authentication information corresponds to the first service; and receiving, by the logical device, an authentication result sent by the authentication server, where the authentication result includes a correspondence, and the correspondence includes the ID of the logical device and the IDs of the N user equipments.

Optionally, the binding, by the gateway device, the ID of the logical device and the IDs of the N user equipments includes: performing, by the gateway device, validity authentication on the logical device based on identity authentication information, where the identity authentication information is used to authenticate validity of the logical device, and the identity authentication information corresponds to the first service; and obtaining, by the gateway device, an authentication result after determining that the logical device passes the validity authentication, where the authentication result includes a correspondence, and the correspondence includes the ID of the logical device and the IDs of the N user equipments.

The gateway device can establish the logical device after determining that the logical device passes the validity authentication. For example, this can be implemented by binding the ID of the logical device and the IDs of the N user equipments.

According to a second aspect, a gateway device is provided. The gateway device includes a module configured to implement the method according to any one of the first aspect or the possible implementations of the first aspect. In an implementation, the gateway device includes: a first obtaining unit, a second obtaining unit, and a binding unit. Optionally, the gateway device further includes an authentication unit.

According to a third aspect, a gateway device is provided. The gateway device includes: a processor, a memory, and a communications interface. The processor, the memory, and the communications interface are connected by using a communications bus. The memory is configured to store a program. The processor performs the method according to any one of the first aspect or the possible implementations of the first aspect according to an executable instruction included in the program read from the memory.

According to a fourth aspect, an authentication system is provided. The system includes the gateway device according to the second aspect or the third aspect and an authentication apparatus. Optionally, the system further includes the N user equipments.

According to the method provided in the foregoing implementations in this application, the gateway device obtains the ID of the logical device based on the information about the first service. The gateway device binds the IDs of the user equipments and the ID of the logical device. In this way, the logical device can manage the user equipments bound to the logical device and a service provider does not need to deploy a dedicated management apparatus for a service. This helps reduce complexity of operation and maintenance.

DETAILED DESCRIPTION OF ILLUSTRATIVE EMBODIMENTS

Application scenarios described in the embodiments of this application are intended to describe the technical solutions of the embodiments of this application more clearly and do not constitute any limitation on the technical solutions provided in the embodiments of this application. Persons of ordinary skill in the art may be aware that as network architectures evolve and new service scenarios emerge, the technical solutions provided in the embodiments of this application are also applicable to similar technical problems.

Figure 1:
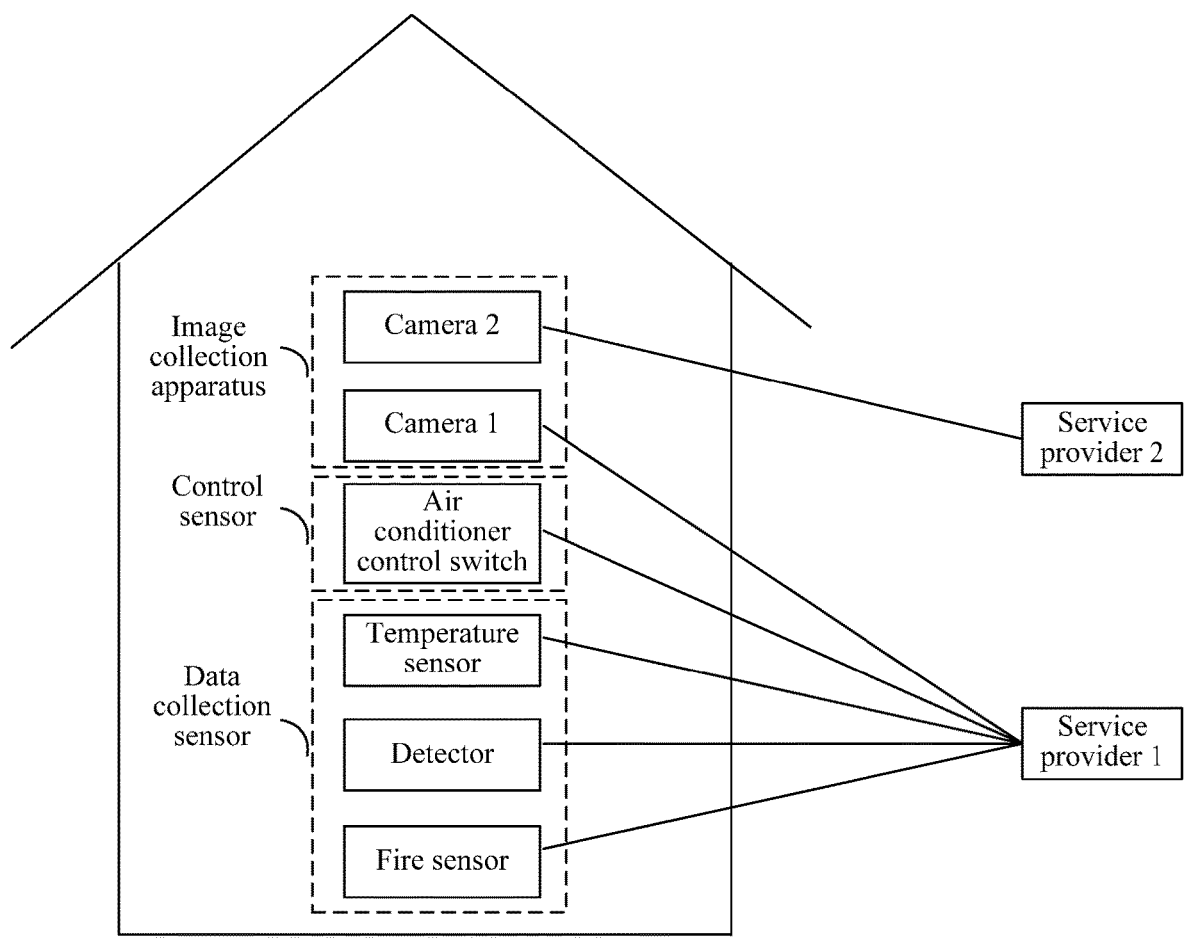
FIG. 1 is a schematic diagram of a network scenario.

FIG. 1 is a schematic diagram of a network scenario. In the network scenario in FIG. 1, the IoT includes: an image collection apparatus, a control sensor, and a data collection sensor. The image collection apparatus includes a camera 2 and a camera 1. The control sensor includes an air conditioner control switch. The data collection sensor includes a temperature sensor, a detector, and a fire sensor. If a user customizes a baby care service from a service provider 1, the service provider 1 provides the camera 1, the air conditioner control switch, the temperature sensor, and the fire sensor for the user. The sensors and the image collection apparatus related to the service provider 1 are configured to implement a baby care function. If the user further customizes a surveillance and control service from a service provider 2, the service provider 2 provides the camera 2 and the detector for the user. The sensors and the image collection apparatus related to the service provider 2 are configured to implement a surveillance and control function.

In the network scenario shown in FIG. 1, the service provider 2 and the service provider 1 respectively deploy the corresponding user equipments based on the services customized by the user. Before the user registers the surveillance and control service and the baby care service, the corresponding service providers need to authenticate one by one sensors and image collection apparatuses that have already been installed. In addition, it can be learned from the network scenario in FIG. 1 that, both the services provided by the service provider 2 and the service provider 1 need to use an image collection apparatus. However, the service provider 2 and the service provider 1 cannot share a same image collection apparatus. For example, the camera 1 and the camera 2 need to be set to monitor a situation inside a house of a same user, and currently, different service providers respectively manage user equipments provided by the different service providers. Consequently, the entire authentication and management process is relatively complex and operation and maintenance costs are relatively high.

To resolve the foregoing problems, the embodiments of this application provide a user equipment management method and a device. A logical device is set in a gateway device. The logical device manages user equipment related to a service. For example, the gateway device identifies the user equipment related to the service. The user equipment is a terminal configured to implement the service, for example, a sensor, an image collection apparatus, a micromotor, a sensor, or a detector. The gateway device binds the user equipment related to the service and the logical device passing the validity authentication, so that the logical device passing the validity authentication does not need to identify the user equipment related to the service after the user equipment related to the service is restarted after power off. The logical device passing the validity authentication can filter out user equipment that needs to access a network but is not bound. The logical device can manage the user equipment related to the service. For example, the logical device can send data uploaded by the user equipment related to the service to a service provider, and the service provider does not need to deploy a corresponding manage apparatus for each service. This simplifies the authentication and management procedure to some extent. In addition, for a first service and a second service that need to be monitored, where the first service and the second service are different services, a first logical device may be set in the gateway device for the first service and a second logical device may be set in the gateway device for the second service. The first logical device and the second logical device may share a same image collection apparatus to obtain monitored image data, thereby reducing service costs to some extent.

Figure 2:
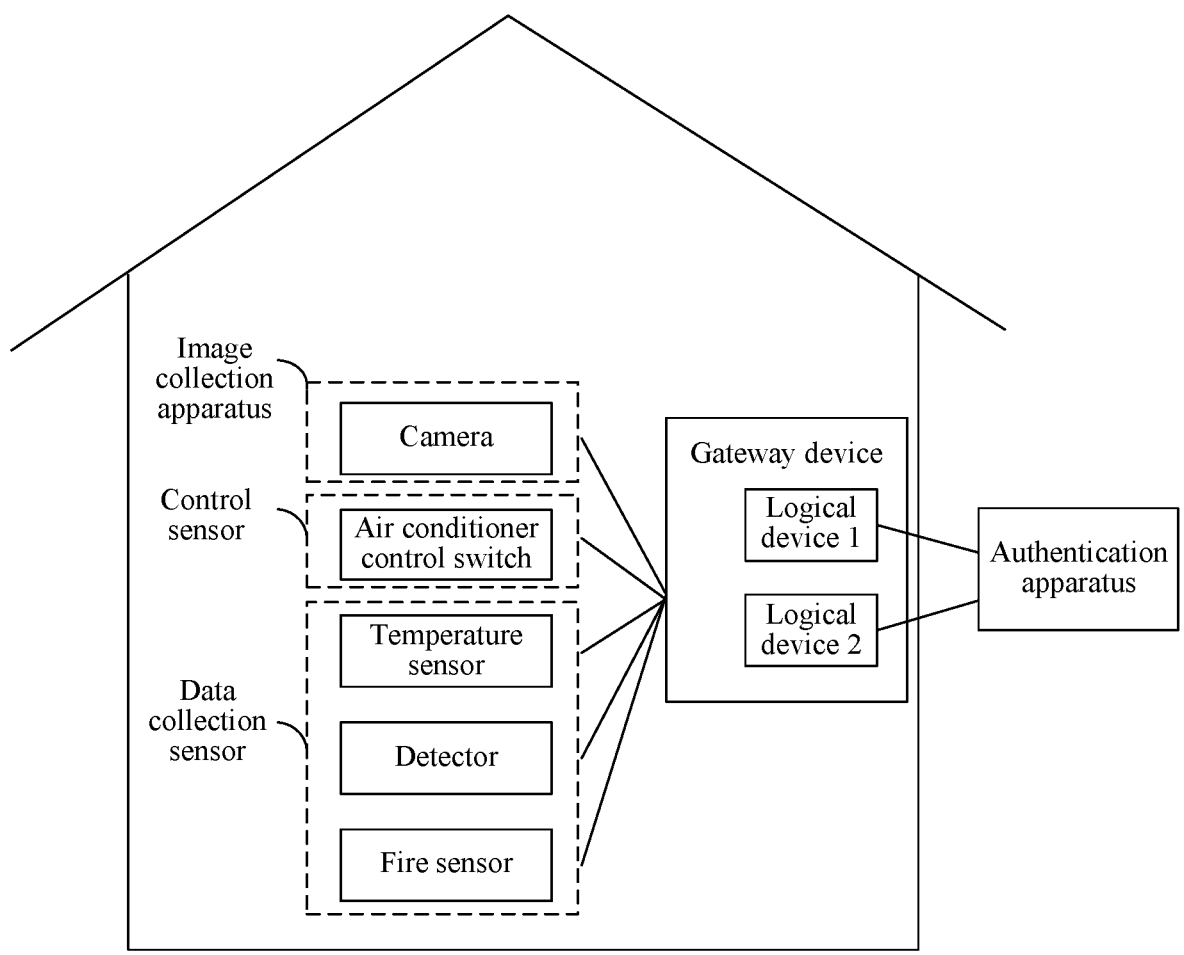
FIG. 2 is a schematic diagram of a network scenario according to an embodiment of this application.

FIG. 2 is a schematic diagram of a network scenario according to an embodiment of this application. In the network scenario shown in FIG. 2, a logical device 1 and a logical device 2 may be set in a home gateway. In another implementation, the logical device 1 and the logical device 2 may be set in a network side device. The home gateway and the network side device in this embodiment of this application belong to the category of a gateway device. The network side device may be a central office (CO) device, a point of presence (PoP) device, or a network side server. The CO device may be a digital subscriber line access multiplexer (DSLAM), an optical line termination (OLT), a cable modem termination system (CMTS), or a converged cable access platform (CCAP). The PoP device may be a broadband access server (BRAS) or a broadband network gateway (BNG). An authentication apparatus may be a network side device capable of performing validity authentication, for example, an authentication, authorization and accounting (AAA) server. Alternatively, the authentication apparatus may be set in a same device in which the logical device 1 and the logical device 2 are set. Alternatively, the authentication apparatus may be set in a user side device capable of communicating with the logical device 1 and the logical device 2, for example, a customer edge (CE) or a customer-premises equipment (CPE).

In a following embodiment of this application, an authentication method is described based on a scenario in which a gateway device is a home gateway. In this scenario, a logical device 1 and a logical device 2 are set in the home gateway. An authentication method in another possible scenario described above is substantially the same as the method provided in the following embodiment of this application, and is not further described in the embodiments of this application.

Figure 3:
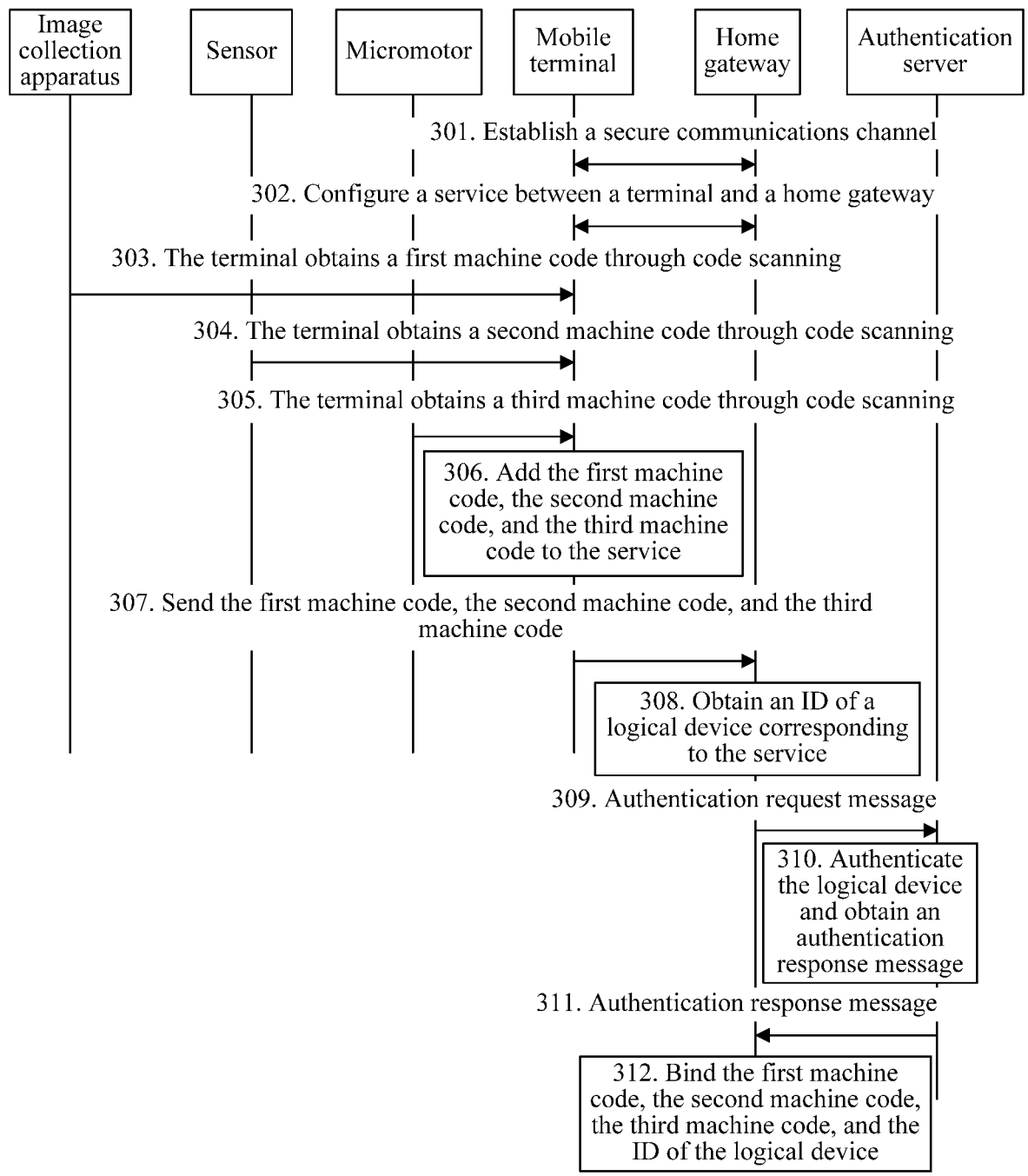
FIG. 3 is a flowchart of a user equipment management method according to Embodiment 1 of this application.

FIG. 3 is a flowchart of a user equipment management method according to Embodiment 1 of this application. An image collection apparatus in FIG. 3 may be a camera in FIG. 2. A sensor in FIG. 3 includes a control sensor and a data collection sensor in FIG. 2, for example, an air conditioner control switch, a temperature sensor, a detector, and a fire sensor in FIG. 2. A micromotor in FIG. 3 may be configured to control a door lock or a window lock (not shown in FIG. 2). A mobile terminal in FIG. 3 may be a device providing an operation interface and a code scanning function such as a mobile phone, a tablet computer, or an intelligent remote control. A home gateway in FIG. 3 may be a device integrating the logical device 1 and/or the logical device 2 in FIG. 2. An authentication server in FIG. 3 is the authentication apparatus in FIG. 2. The home gateway in FIG. 3 is the gateway device in FIG. 2. The following describes the method provided in Embodiment 1 of this application with reference to FIG. 2 and FIG. 3.

301: Establish a secure communications channel between the mobile terminal and the home gateway.

For example, when the logical device is set in the home gateway, the mobile terminal may communicate with the home gateway in which the logical device is located by using a wireless network or a mobile network, to establish a secure communications channel with the home gateway. The mobile terminal may establish the communications channel with the home gateway in which the logical device is located by using a wireless communications technology such as a ZigBee technology, a Zwave technology or Wireless Fidelity (Wi-Fi) or a wired communications technology (for example, the Ethernet). In other words, the home gateway in which the logical device is located performs wireless communication with the mobile terminal.

For example, when the logical device is set in a network side device, the mobile terminal may communicate with the network side device in which the logical device is located by using a mobile network, to establish a secure communications channel with the network side device. The mobile terminal may access the home gateway by using a wireless communications technology such as a ZigBee technology, a Zwave technology or Wi-Fi or a wired communications technology such as the Ethernet. Then, the mobile terminal establishes the secure communications channel with the network side device in which the logical device is located by using a wired communications technology between the home gateway and the network side device. In other words, the network side device in which the logical device is located communicates with the mobile terminal.

302. Configure a service between the mobile terminal and the home gateway.

For example, the configuring a service between the mobile terminal and the home gateway includes: obtaining, by the mobile terminal, a first client, where the first client is configured to communicate with user equipment; sending, by the mobile terminal, first indication information to the home gateway, where the first indication information is used to instruct the home gateway to download a second client, the second client is configured to implement the service by using the user equipment, and the service is a service customized by a user from one or more service providers; obtaining, by the home gateway, the second client based on the first indication information; obtaining, by the home gateway, identity authentication information by using the second client, where the identity authentication information corresponds to the service, and the identity authentication information is used to authenticate validity of the logical device; and sending, by the home gateway, second indication information to the mobile terminal, where the second indication information is used to instruct the mobile terminal to output an operation interface for displaying the service.

The first client may be application software configured to communicate with the user equipment. The user equipment is a terminal configured to implement the service customized by the user. The user equipment may include the image collection apparatus, the sensor and the micromotor in FIG. 3. The mobile terminal may download the first client from a server or a website of a service provider. The home gateway may download the second client from the server or the website of the service provider.

After obtaining the first client, the mobile terminal may install and run the first client. The mobile terminal on which the first client runs may be used as an input/output device of the logical device set in the home gateway. After obtaining the second client, the home gateway may install and run the second client. The home gateway on which the second client runs may obtain the identity authentication information from the server or the website of the service provider. The identity authentication information may be information in a form such as a password, a random code or a digital certificate. This is not limited in this embodiment of this application.

303. The mobile terminal obtains a first machine code through code scanning.

For example, the mobile terminal may obtain the first machine code by starting a code scanning program on the operation interface of the service. The first machine code is a machine code of the image collection apparatus. The machine code in this embodiment of this application may be a combination of N numbers and M characters. N is an integer greater than or equal to 0, M is an integer greater than or equal to 0, and N and M are not 0 at the same time. There is a pattern in a form such as a two-dimensional barcode or a bar code on a machine body or in a specification of the image collection apparatus. The mobile terminal may use a common code scanning technology to scan the foregoing pattern to obtain the first machine code. A specific implementation of the code scanning technology is not described herein.

304. The mobile terminal obtains a second machine code through code scanning.

For example, the mobile terminal may use the method in 303 to obtain the second machine code. The second machine code is a machine code of the sensor.

305. The mobile terminal obtains a third machine code through code scanning.

For example, the mobile terminal may use the method in 303 to obtain the third machine code. The third machine code is a machine code of the micromotor.

306. The mobile terminal adds the first machine code, the second machine code, and the third machine code to the service.

For example, the mobile terminal may add a machine code confirmed by the user to the service. For example, the user may select the first machine code, the second machine code, and the third machine code by using the operation interface of the service. The mobile terminal may add the first machine code, the second machine code, and the third machine code selected by the user to an application program or a client of the service. If the user selects the first machine code and the second machine code by using the operation interface of the service, the mobile terminal may add the first machine code and the second machine code selected by the user to the application program or the client of the service. Specifically, the user may select, by using the operation interface of the service installed in the mobile terminal, a machine code that needs to be added to the service.

307. The mobile terminal sends the first machine code, the second machine code, and the third machine code to the home gateway.

For example, the mobile terminal may send the first machine code, the second machine code, and the third machine code to the home gateway by using an application layer protocol, so that the home gateway adds the first machine code, the second machine code, and the third machine code to the application program or the client of the service.

The mobile terminal may send the first machine code, the second machine code, and the third machine code to the home gateway by using the communications channel between the mobile terminal and the home gateway. When there is a binding relationship between the communications channel and the service, the mobile terminal and the home gateway may determine information about the service based on the communications channel. The information about the service includes information for identifying the service, for example, an identifier of the service.

Optionally, the mobile terminal sends a first correspondence to the home gateway. The first correspondence includes the first machine code, the second machine code, the third machine code, and the information about the service.

308. The home gateway obtains an identifier (ID) of the logical device corresponding to the service.

For example, when the communications channel between the mobile terminal and the logical device corresponds to the service, the logical device may obtain the information about the service by using the communications channel. Alternatively, the logical device may obtain the information about the service based on the first correspondence.

For example, the logical device stores a second correspondence. The second correspondence includes the information about the service and the ID of the logical device. The logical device may obtain the ID of the logical device based on the information about the service and the second correspondence. The ID of the logical device is used to identify the logical device needing to be established.

309. The home gateway sends an authentication request message to an authentication server.

For example, the home gateway may obtain the identity authentication information corresponding to the service in 302. The home gateway obtains the authentication request message based on the identity authentication information, the first machine code, the second machine code, the third machine code, and the ID of the logical device. The authentication request message includes the identity authentication information, the first machine code, the second machine code, the third machine code, and the ID of the logical device. The authentication request message is used to request the authentication server to authenticate the logical device needing to be established. The home gateway may further use another message to send the identity authentication information, the first machine code, the second machine code, the third machine code, and the ID of the logical device. A possible message is not described by way of example herein.

Figure 5:
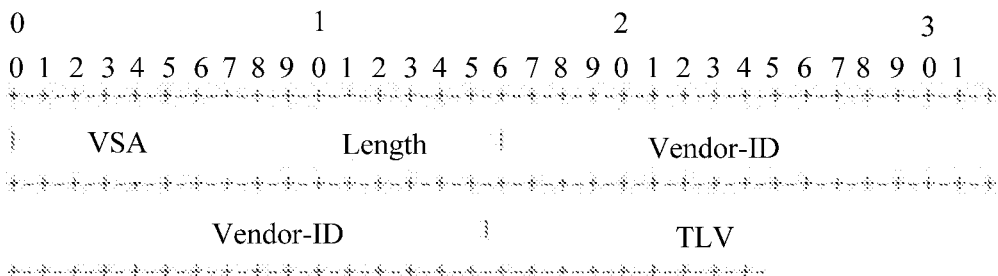
FIG. 5 is a schematic diagram of an AAA message according to an embodiment of this application.

For example, when the authentication server is an AAA server, the authentication request message may be an extended AAA message, as shown in FIG. 5. A VSA in FIG. 5 is used to identify that the AAA message carries a particular attribute of the service provider. A Vendor-ID is an identifier of the service provider. A TLV is used to carry the first machine code, the second machine code, the third machine code, and the ID of the logical device. Optionally, the TLV may further carry a task identifier. The task identifier may be used to identify that the AAA message is used to add a device to the service. The authentication request message may include an address of the home gateway and an address of the authentication server. Specific forms of the addresses are not described one by one in detail herein. Optionally, the address of the home gateway may further be replaced by identification information that is of the home gateway and that can be identified by the authentication server.

310. The authentication server authenticates the logical device and obtains an authentication response message.

For example, the authentication server authenticates the logical device based on the identity authentication information included in the authentication request. After determining that the logical device is a valid logical device, the authentication server obtains the authentication response message based on the first machine code, the second machine code, the third machine code, and the ID of the logical device. The authentication response message includes the first machine code, the second machine code, the third machine code, and the ID of the logical device. The authentication response message is used to inform the home gateway of an authentication result of the logical device. The authentication server authenticates the logical device based on the identity authentication information, so that authorized user equipment can access and implement the service. The process of obtaining the machine code by the mobile terminal implements authentication on the validity of the user equipment accessing the service, in other words, the machine code obtained through code scanning is considered to be a machine code of authorized user equipment. This helps simplifying the authentication procedure of the user equipment accessing the service without lowering security.

For example, an example in which the identity authentication information is a password is used. The authentication request sent by the home gateway to the authentication server includes the password. The authentication server authenticates whether the password included in the authentication request is consistent with a pre-delivered password. After determining that the password included in the authentication request is consistent with the pre-delivered password, the authentication server confirms that the logical device passes the authentication. For example, the identity authentication information is a random code. The authentication request sent by the home gateway to the authentication server includes the random code. The authentication server authenticates whether the random code included in authentication request is consistent with a pre-delivered random code. After determining that the random code included in the authentication request is consistent with the pre-delivered random code, the authentication server confirms that the logical device passes the authentication. For example, the identity authentication information is a digital certificate. The authentication request sent by the home gateway to the authentication server includes a digital certificate signed with a public key. The public key corresponds to the digital certificate. The authentication server authenticates, by using a private key corresponding to the digital certificate, validity of the digital certificate signed with the public key. If the authentication succeeds, the authentication server confirms that the logical device passes the authentication.

For example, when the authentication server is an AAA server, the authentication response message may be an extended AAA message, as shown in FIG. 5. In addition to the content shown in FIG. 5, the authentication response message may further include an address of the home gateway. The address of the home gateway may be an IP address assigned to the home gateway. Other forms of addresses that may be used are not described one by one by way of example herein.

311. The authentication server sends the authentication response message to the home gateway.

For example, the authentication server may send the authentication response message to the home gateway based on the address of the home gateway. Optionally, the authentication server may alternatively send the authentication response message to the home gateway based on the identification information of the home gateway.

312. The home gateway binds the first machine code, the second machine code, the third machine code, and the ID of the logical device, to generate the logical device.

For example, the home gateway may obtain a third correspondence based on the first machine code, the second machine code, the third machine code, and the ID of the logical device, to bind the first machine code, the second machine code, the third machine code, and the ID of the logical device. The third correspondence includes the first machine code, the second machine code, the third machine code, and the ID of the logical device. The home gateway binds the first machine code, the second machine code, the third machine code, and the ID of the logical device, to implement the operation of generating the logical device.

After the logical device is generated, the generated logical device may perform a management operation, a filtering operation, or the like on the user equipments in the home network such as the sensor and the micromotor.

Optionally, the logical device may further obtain an IP address of the logical device by using an address assignment protocol such as the Dynamic Host Configuration Protocol (DHCP). The logical device may use the IP address of the logical device to communicate with the service provider.

In the method provided in Embodiment 1 of this application, validity of user equipment of a service is confirmed by the mobile terminal through code scanning. The mobile terminal sends a machine code of the user equipment configured to implement the service to a physical device, for example, a home gateway, in which a to-be-established logical device is located. The home gateway sends obtained identity authentication information of the service, the machine code obtained from the mobile terminal, and an ID of the logical device to an authentication server. The authentication server performs validity authentication on the to-be-established logical device based on the identity authentication information. After the to-be-established logical device passes the validity authentication, the authentication server delivers, to the home gateway, the ID of the logical device and the machine code of the user equipment that can be controlled by the logical device. The home gateway binds the ID of the logical device and an ID of the user equipment, to complete the operation of establishing the logical device.

In the scenario in FIG. 2, after the logical device 1 and the logical device 2 are established, a function of collecting images in the service corresponding to the logical device 1 and the logical device 2 can be implemented by using a camera, thereby avoiding that a user deploys a plurality of cameras to respectively complete image collection. In addition, before beginning the service, the logical device in this embodiment of this application may bind, at a time, user equipments configured to implement the service, thereby reducing authentication complexity. The logical device provided in this embodiment of this application may further replace a service provider to manage the user equipments configured to implement the service, thereby resolving problems such as sensor signal analysis and control.

Optionally, the mobile terminal in the scenario in FIG. 3 may be replaced by a fixed terminal. The fixed terminal may be a device capable of implementing a code scanning function such as a computer. This is not described by way of example herein.

Figure 4:
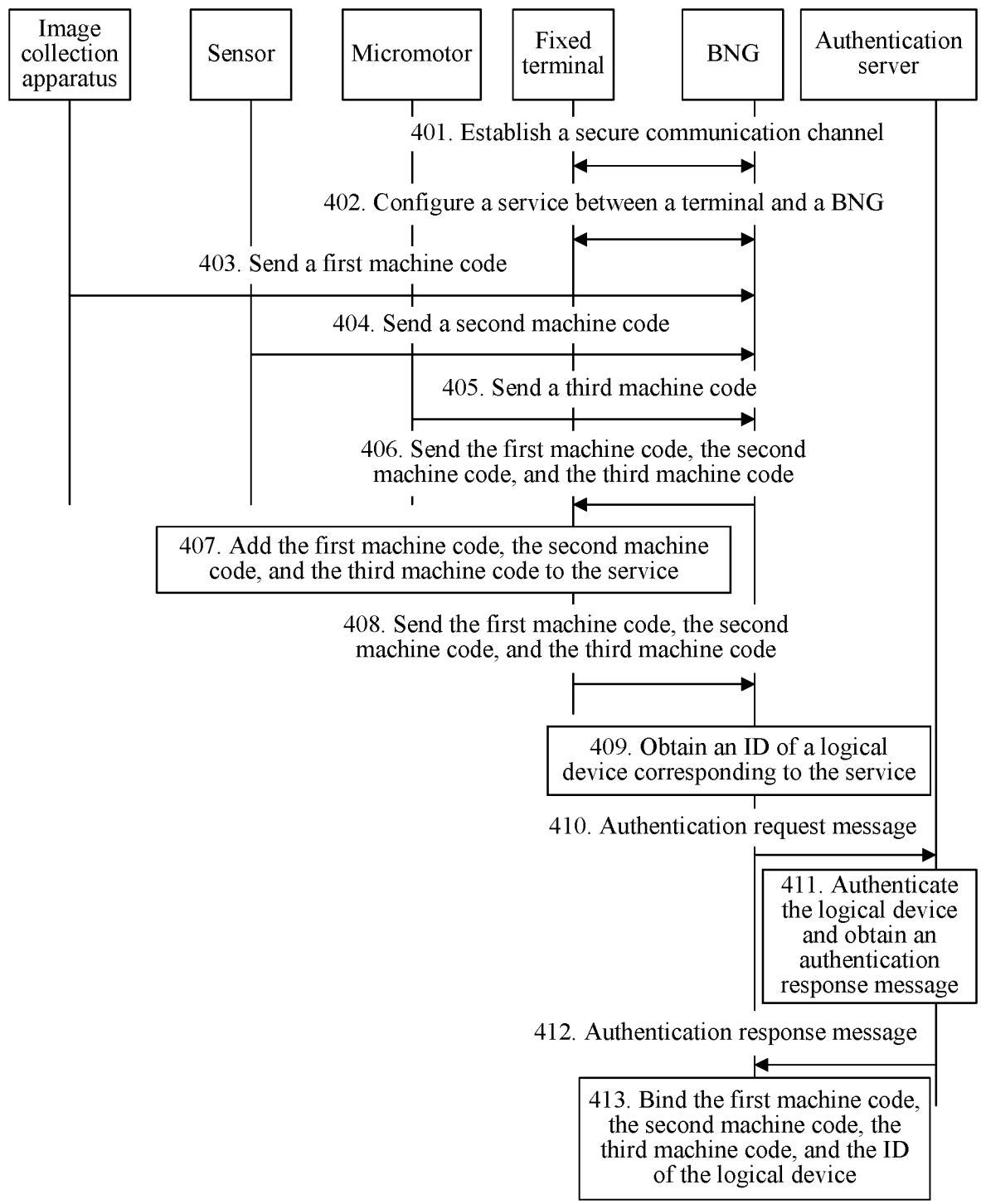
FIG. 4 is a flowchart of a user equipment management method according to Embodiment 2 of this application.

FIG. 4 is a flowchart of a user equipment management method according to Embodiment 2 of this application. In the method provided in Embodiment 2 of this application, the mobile terminal in Embodiment 1 of this application is replaced by a fixed terminal, and the home gateway in Embodiment 1 of this application is replaced by a network side device, for example, a BNG. In Embodiment 2 of this application, a logical device is set in the BNG. A general concept of the method provided in Embodiment 2 of this application is the same as that in Embodiment 1, and is different in a method of obtaining a first machine code, a second machine code, and a third machine code. The following describes the user equipment management method provided in Embodiment 2 of this application with reference to FIG. 2 and FIG. 4.

401. Establish a secure communications channel between the fixed terminal and the BNG.

For a specific implementation of 401, refer to the content of 301 in Embodiment 1, and details are not described herein again. The fixed terminal may communicate with the BNG by using a home gateway and a wired network. A specific implementation that is used is not described by way of example herein.

402. Configure a service between the fixed terminal and the BNG.

For a specific implementation of 402, refer to the content of 302 in Embodiment 1, and details are not described herein again.

403. An image collection apparatus sends a first machine code to the BNG.

For example, the image collection apparatus stores the first machine code. The image collection apparatus may communicate with the BNG by using a wireless or a wired communications network. To be specific, the image collection apparatus communicates with the home gateway by using the wireless or the wired communications network and communicates with the BNG by using the home gateway. The image collection apparatus may send the first machine code to the BNG by using the wireless or the wired communications network. The first machine code may be the first machine code in the method provided in Embodiment 1. The wireless or the wired communications network used by the image collection apparatus may be the same as a wireless or the wired communications network used by the fixed terminal.

404. A sensor sends a second machine code to the BNG.

For example, the sensor stores the second machine code. The sensor may communicate with the BNG by using the wireless or the wired communications network. The method used by the sensor to send the second machine code to the BNG is the same as the sending method in 403, and details are not described herein again. The second machine code may be the second machine code in the method provided in Embodiment 1.

405. A micromotor sends a third machine code to the BNG.

For example, the micromotor stores the third machine code. The micromotor may communicate with the BNG by using the wireless or the wired communications network. The method used by the micromotor to send the third machine code to the BNG is the same as the sending method in 403, and details are not described herein again. The third machine code may be the third machine code in the method provided in Embodiment 1.

406. The BNG sends the first machine code, the second machine code, and the third machine code to the fixed terminal.

For example, the BNG may send the first machine code, the second machine code, and the third machine code to the fixed terminal by using the communications channel established in 401.

407. The fixed terminal adds the first machine code, the second machine code, and the third machine code to the service.

For a specific implementation of 407, refer to the content of 306 in Embodiment 1, and details are not described herein again.

408. The fixed terminal sends the first machine code, the second machine code, and the third machine code to the BNG.

For a specific implementation of 408, refer to the content of 307 in Embodiment 1, and details are not described herein again.

409. The BNG obtains an ID of a logical device corresponding to the service.

For a specific implementation of 409, refer to the content of 308 in Embodiment 1, and details are not described herein again.

410. The BNG sends an authentication request message to an authentication server.

For a specific implementation of 410, refer to the content of 309 in Embodiment 1, and details are not described herein again.

411. The authentication server authenticates the ID of the logical device and obtains an authentication response message.

For a specific implementation of 411, refer to the content of 310 in Embodiment 1, and details are not described herein again.

412. The authentication server sends the authentication response message to the BNG.

For a specific implementation of 412, refer to the content of 311 in Embodiment 1, and details are not described herein again.

413. The BNG binds the first machine code, the second machine code, the third machine code, and the ID of the logical device.

For a specific implementation of 413, refer to the content of 312 in Embodiment 1, and details are not described herein again.

The BNG obtains a third correspondence when or after binding the first machine code, the second machine code, the third machine code, and the ID of the logical device. The third correspondence includes the first machine code, the second machine code, the third machine code, and the ID of the logical device.

Optionally, after 413, when the image collection apparatus, the sensor, and the micromotor are powered off and then powered on again, the image collection apparatus, the sensor, and the micromotor may send, to the logical device set in the BNG and by using the wireless or the wired communications network, the machine codes of the image collection apparatus, the sensor, and the micromotor. For example, the image collection apparatus sends the first machine code to the logical device, the sensor sends the second machine code to the logical device, and the micromotor sends the third machine code to the logical device. The logical device set in the BNG determines that the third correspondence includes the first machine code, the second machine code, and the third machine code, determines that the image collection apparatus, the sensor, and the micromotor are user equipments managed by the logical device, and allows the image collection apparatus, the sensor, and the micromotor to access the service. If unauthorized user equipment sends a fourth machine code to the logical device, where the fourth machine code is used to identify the unauthorized user equipment, the logical device determines, based on the third correspondence, that the third correspondence does not include the fourth machine code, and does not allow the unauthorized user equipment to access the service.

According to the method provided in Embodiment 2 of this application, the user equipments, for example, the image collection apparatus, the sensor, and the micromotor send, to the BNG and by using the wireless or the wired communications network, the machine codes of the image collection apparatus, the sensor, and the micromotor. The BNG presents, to a user and by using the fixed terminal, the machine codes of the user equipments configured to implement the service, thereby further simplifying authentication of the user equipments configured to implement the service. The method that the BNG interacts with the authentication server to implement authentication of the BNG is the same as that provided in Embodiment 1.

Figure 6:
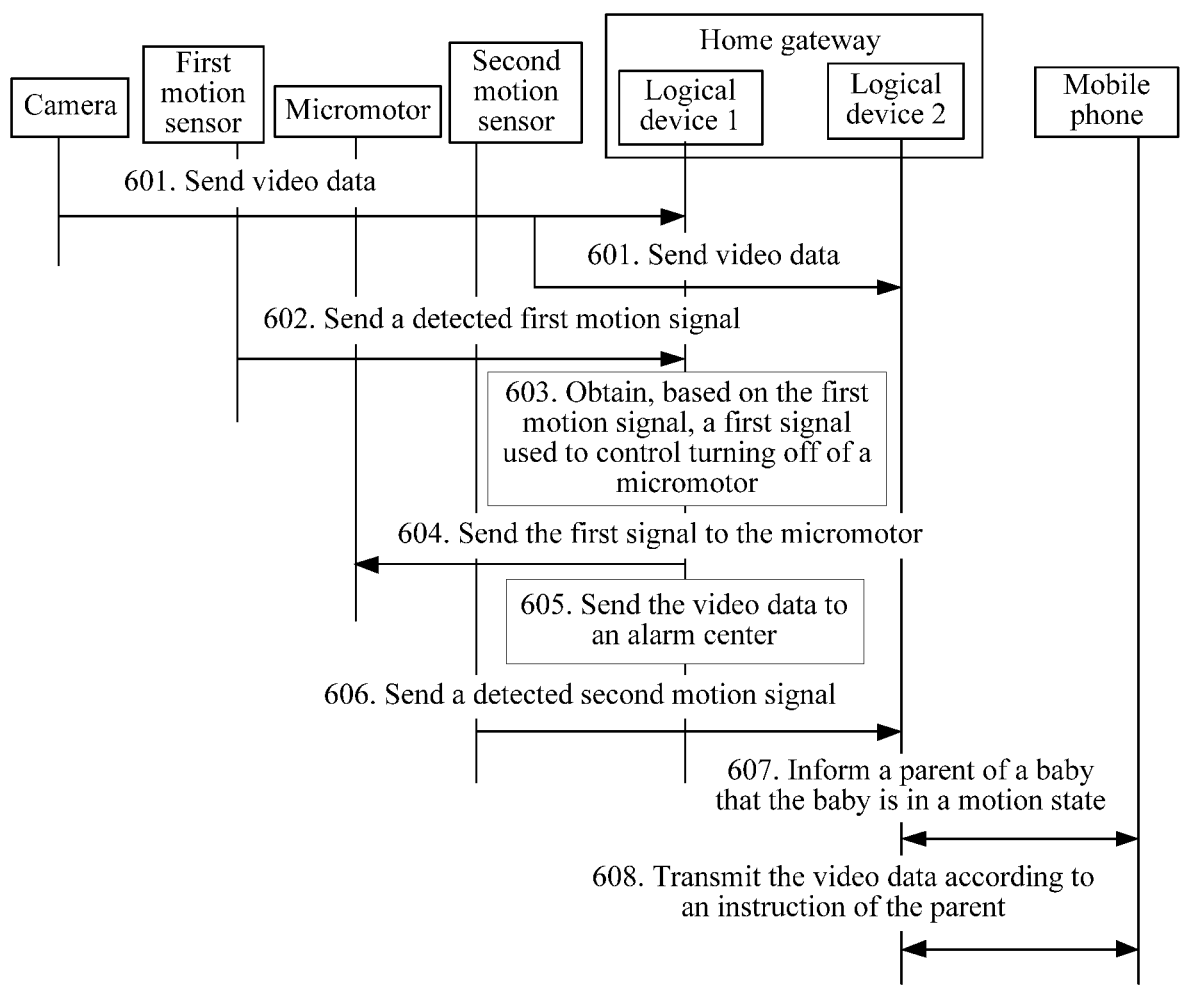
FIG. 6 is a flowchart of a user equipment management method according to Embodiment 3 of this application.

FIG. 6 is a flowchart of a user equipment management method according to Embodiment 3 of this application. A camera, a first motion sensor, and a micromotor in FIG. 6 are user equipments controlled by a logical device 1 in a home gateway. The first motion sensor is a motion sensor set on a door and/or a window. The micromotor is a micromotor set on the door and/or the window. The camera and a second motion sensor in FIG. 6 are user equipments controlled by a logical device 2 in the home gateway. The second motion sensor is a motion sensor set in a baby room. The following describes the user equipment management method provided in Embodiment 3 of this application with reference to FIG. 3 and FIG. 6.

601. The camera sends video data to the logical device 1 and the logical device 2 in the home gateway.

For example, the camera collects video data in real time. The video data is video data obtained in a range monitored by the camera. The camera may send the video data to the logical device 1 and the logical device 2 in the home gateway by using a wired network or a wireless network in a house of a user. The camera in FIG. 6 may upload the obtained video data by using 601. Optionally, the camera may send the video data to the logical device 1 and the logical device 2 periodically based on preset parameters.

602. The first motion sensor sends a detected first motion signal to the logical device 1.

For example, the first motion sensor obtains the first motion signal when a location of the door and/or the window is changed. The first motion signal may indicate that the first motion sensor detects that the location of the door and/or the window is changed, for example, the door or the window is opened. The first motion sensor may send the first motion signal to the logical device 1 by using the wired network or the wireless network in the house of the user.

603. The logical device 1 obtains, based on the first motion signal, a first signal used to control turning off of the micromotor.

For example, when the logical device 1 obtains the first motion signal, it indicates that the door or the window of the user is opened and there is a potential safety risk, and the opened door or window needs to be controlled to be closed by the micromotor. When the first motion signal indicates that the door is opened, the first signal is used to control the micromotor set on the door to close the opened door. When the first motion signal indicates that the window is opened, the first signal is used to control the micromotor set on the window to close the opened window. When the first motion signal indicates that both the door and the window are opened, the first signal is used to control the micromotor set on the door to close the opened door and control the micromotor set on the window to close the opened window.

604. The logical device 1 sends the first signal to the micromotor.

For example, the logical device 1 may send the first signal to the micromotor by using the wired network or the wireless network in the house of the user.

605. The logical device 1 sends the video data to an alarm center.

For example, after the first motion signal is detected, it indicates that there is a potential safety risk in the house of the user. The logical device 1 sends, to the alarm center, the video data uploaded by the camera in real time, so that the alarm center knows that there is a safety problem in the house of the user. The video data may be the video data uploaded by the camera in 601.

606. The second motion sensor sends a detected second motion signal to the logical device 2.

For example, the second motion sensor is configured to monitor whether a baby is in a motion state. When a location of the baby is changed or when the baby is in the motion state, the second motion sensor can detect the second motion signal. The second motion signal is used to indicate that the baby is in the motion state.

607. The logical device 2 informs, by using a mobile phone, a parent of a baby that the baby is in a motion state.

For example, the logical device 2 may determine, after receiving the second motion signal, that the baby is in the motion state. The logical device 2 may send a message to the mobile phone of the parent of the baby. The message is used to inform the parent of the baby that the baby is in the motion state.

608. The logical device 2 may transmit the video data to the mobile phone according to an instruction of the parent.

For example, after receiving the instruction sent by the mobile phone, the logical device 2 transmits the video data obtained from the camera to the mobile phone. The instruction is used to instruct the logical device 2 to provide the video data of the monitored baby. The video data obtained by the camera includes the video data of the monitored baby.

In the method according to Embodiment 3 of this application, the logical device 1 and the logical device 2 may share a same camera to monitor a situation inside the house of the user. The logical device 1 and the logical device 2 can manage the user equipments managed by the logical device 1 and the logical device 2, and an additional management apparatus provided by a service provider does not need to be deployed. This helps reduce costs and improve user experience.

Figure 7:
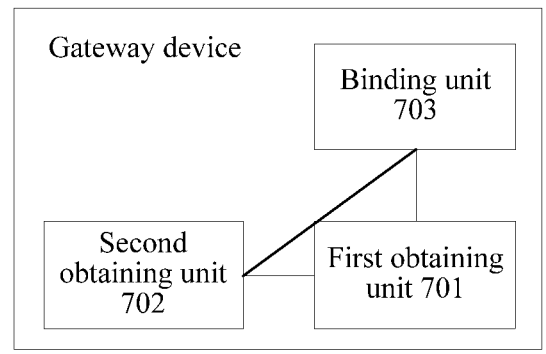
FIG. 7 is a schematic diagram of a gateway device according to Embodiment 1 of this application.

FIG. 7 is a schematic diagram of a gateway device according to Embodiment 1 of this application. The gateway device provided in Embodiment 1 of this application may be the home gateway or the network side device in the foregoing embodiments. The gateway device provided in Embodiment 1 of this application is described below with reference to FIG. 7.

The gateway device provided in Embodiment 1 of this application includes a first obtaining unit 701, a second obtaining unit 702, and a binding unit 703.

The first obtaining unit 701 is configured to obtain identifiers IDs of N user equipments and information about a first service, where the N user equipments are terminals configured to implement the first service, and N is an integer greater than or equal to 1.

The second obtaining unit 702 is configured to obtain an ID of a logical device based on the information about the first service, where the logical device is a set of logical elements that are in the gateway device and that are configured to implement the first service.

The binding unit 703 is configured to bind the ID of the logical device and the IDs of the N user equipments.

For example, the first obtaining unit 701 is specifically configured to: receive a first correspondence sent by a terminal device, where the first correspondence includes the IDs of the N user equipments and the information about the first service, and the IDs of the N user equipments are information obtained after the terminal device identifies the N user equipments; and obtain the IDs of the N user equipments and the information about the first service from the first correspondence. Alternatively, the first obtaining unit 701 is specifically configured to: receive the IDs of the N user equipments sent by the N user equipments respectively; send the IDs of the N user equipments to a terminal device; receive a first correspondence sent by the terminal device, where the first correspondence includes the IDs of the N user equipments and the information about the first service; and obtain the IDs of the N user equipments and the information about the first service from the first correspondence.

For example, the second obtaining unit 702 is specifically configured to: obtain the ID of the logical device based on a second correspondence and the information about the first service, where the second correspondence includes the information about the first service and the ID of the logical device; or generate the ID of the logical device based on the information about the first service and a preset algorithm.

For example, the binding unit 703 is specifically configured to: send identity authentication information, the ID of the logical device, and the IDs of the N user equipments to an authentication server, where the identity authentication information is used to authenticate validity of the logical device, and the identity authentication information corresponds to the first service; receive an authentication result sent by the authentication server, where the authentication result includes a correspondence, and the correspondence includes the ID of the logical device and the IDs of the N user equipments. Alternatively, the binding unit is specifically configured to: perform validity authentication on the logical device based on identity authentication information, where the identity authentication information is used to authenticate validity of the logical device, and the identity authentication information corresponds to the first service; obtain an authentication result after determining that the logical device passes the validity authentication, where the authentication result includes a correspondence, and the correspondence includes the ID of the logical device and the IDs of the N user equipments.

Optionally, the authentication unit is configured to send the correspondence to the logical device corresponding to the ID of the logical device.

Figure 8:
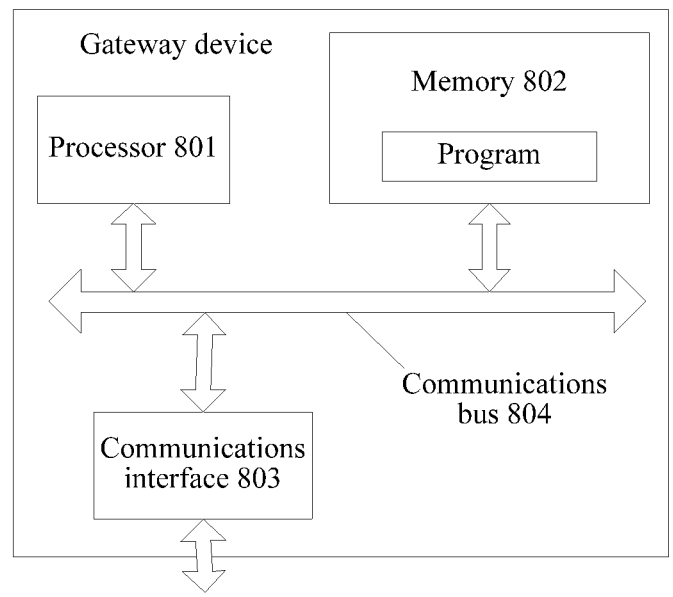
FIG. 8 is a schematic diagram of a gateway device according to Embodiment 2 of this application.

FIG. 8 is a schematic diagram of a gateway device according to Embodiment 2 of this application. The gateway device provided in Embodiment 2 of this application may be the home gateway or the network side device in the foregoing embodiments. The gateway device provided in Embodiment 2 of this application may be a device the same as the gateway device provided in Embodiment 1 of this application. The gateway device provided in Embodiment 2 of this application is described below with reference to FIG. 8.

The gateway device provided in Embodiment 2 of this application includes a processor 801, a memory 802, and a communications interface 803. The processor 801, the memory 802, and the communications interface 803 are connected by using a communications bus 804. The memory 802 is configured to store a program. The processor 801 performs, according to an executable instruction included in the program read from the memory 802, the method used by the home gateway in Embodiment 1 or the method used by the BNG in Embodiment 2.

An embodiment of this application further provides a system for authenticating user equipment. The system includes the gateway device provided in Embodiment 1 or Embodiment 2 of this application. Optionally, the system may further include the user equipment provided in Embodiment 1 or Embodiment 2 of this application. Optionally, the system may further include the authentication apparatus, for example, the authentication server, provided in Embodiment 1 or Embodiment 2 of this application.

The foregoing general purpose processor may be a microprocessor or the processor may also be any conventional processor, decoder, and the like. The steps of the method disclosed with reference to the embodiments of this application may be directly implemented by a combination of hardware and a software module in the processor. When it is implemented by using software, code that implements the foregoing functions may be stored in a computer-readable medium, where the computer-readable medium includes a computer storage medium. The storage medium may be any available medium accessible to a computer. The following is used as an example but is not limited: The computer readable medium may be a random access memory (RAM), a read-only memory (ROM), an electrically erasable programmable read-only memory (EEPROM), a compact disc read-only memory (CD-ROM) or other optical disk storage, a disk storage medium or other disk storage, or any other medium that can be used to carry or store expected program code in a command or data structure form and can be accessed by a computer. The computer-readable medium may be a compact disc (CD), a laser disc, a digital video disc (DVD), a floppy disk, or a Blu-ray disc.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; for related parts, reference may be made to partial descriptions in the method embodiment.

Finally, it should be noted that the foregoing embodiments are merely examples for describing the technical solutions of this application other than limiting this application. Although this application and benefits of this application are described in detail with reference to the foregoing embodiments, persons of ordinary skill in the art should understand that they may still make modifications to the technical solutions described in the foregoing embodiments or make equivalent replacements to some technical features thereof, without departing from the scope of the claims of this application.

What is claimed is:

1. A user equipment device management method comprising:
    obtaining, by a gateway device, identifiers (IDs) of N user equipment devices and information about a first service, the N user equipment devices being terminals configured to implement the first service, and N being an integer greater than or equal to 1;
    obtaining, by the gateway device, an ID of a logical device based on the information about the first service, the logical device being a set of logical elements that are configured to implement the first service and that are in the gateway device, which comprises two or more logical devices;
    performing, by the gateway device, validity authentication on the logical device based on identity authentication information, the identity authentication information being used to authenticate validity of the logical device;
    obtaining, by the gateway device, an authentication result after determining that the logical device passes the validity authentication, the authentication result comprising a correspondence between the ID of the logical device and the IDs of the N user equipment devices; and binding, by the gateway device, the ID of the logical device and the IDs of the N user equipment devices in accordance with the authentication result.

2. The method according to claim 1, wherein the obtaining, by the gateway device, the IDs of the N user equipment devices and the information about the first service comprises:

receiving, by the gateway device, a first correspondence sent by a terminal device, the first correspondence comprising a correspondence between the IDs of the N user equipment devices and the information about the first service, the IDs of the N user equipment devices being obtained by the terminal device by identifying the N user equipment devices; and obtaining, by the gateway device, the IDs of the N user equipment devices and the information about the first service from the first correspondence.

3. The method according to claim 1, wherein the obtaining, by the gateway device, the IDs of the N user equipment devices and the information about the first service comprises:

receiving, by the gateway device, the IDs of the N user equipment devices from the N user equipment devices, respectively;

sending, by the gateway device, the IDs of the N user equipment devices to a terminal device;

receiving, by the gateway device, a first correspondence sent by the terminal device, the first correspondence comprising a correspondence between the IDs of the N user equipment devices and the information about the first service; and obtaining, by the gateway device, the IDs of the N user equipment devices and the information about the first service from the first correspondence.

4. The method according to claim 1, wherein the obtaining, by the gateway device, the ID of the logical device based on the information about the first service comprises:

obtaining, by the gateway device, the ID of the logical device based on a second correspondence and the information about the first service, the second correspondence comprising a correspondence between the information about the first service and the ID of the logical device.

5. The method according to claim 1, wherein the binding, by the gateway device, the ID of the logical device and the IDs of the N user equipment devices comprises:

sending, by the gateway device, the identity authentication information, the ID of the logical device, and the IDs of the N user equipment devices to an authentication server; and receiving, by the logical device, the authentication result from the authentication server.

6. The method according to claim 1, wherein the obtaining, by the gateway device, the ID of the logical device based on the information about the first service comprises:

generating, by the gateway device, the ID of the logical device based on the information about the first service and a preset algorithm.

7. The method according to claim 5, wherein the method further comprises:

sending, by the gateway device, the correspondence to the logical device corresponding to the ID of the logical device.

8. A gateway device comprising:
a memory storing computer-readable instructions;
a processor coupled with the memory, wherein the processor is configured to execute the instructions to:

obtain identifiers IDs of N user equipment devices and information about a first service, wherein the N user equipment devices are terminals configured to implement the first service, and N is an integer greater than or equal to 1;

obtain an ID of a logical device based on the information about the first service, wherein the logical device is a set of logical elements that are configured to implement the first service and that are in the gateway device, which comprises two or more logical devices;

perform validity authentication on the logical device based on identity authentication information, wherein the identity authentication information is used to authenticate validity of the logical device;

obtain an authentication result after determining that the logical device passes the validity authentication, wherein the authentication result comprises a correspondence between the ID of the logical device and the IDs of the N user equipment devices; and bind the ID of the logical device and the IDs of the N user equipment devices in accordance with the authentication result.

9. The gateway device according to claim 8, wherein the processor is configured to execute the instructions to:

receive a first correspondence sent by a terminal device, wherein the first correspondence comprises a correspondence between the IDs of the N user equipment devices and the information about the first service, and the IDs of the N user equipment devices are obtained by the terminal device by identifying the N user equipment devices; and obtain the IDs of the N user equipment devices and the information about the first service from the first correspondence.

10. The gateway device according to claim 8, wherein the processor is configured to execute the instructions to:

receive the IDs of the N user equipment devices from the N user equipment devices, respectively;

send the IDs of the N user equipment devices to a terminal device;

receive a first correspondence sent by the terminal device, wherein the first correspondence comprises a correspondence between the IDs of the N user equipment devices and the information about the first service; and obtain the IDs of the N user equipment devices and the information about the first service from the first correspondence.

11. The gateway device according to claim 8, wherein the processor is configured to execute the instructions to:

obtain the ID of the logical device based on a second correspondence and the information about the first service, wherein the second correspondence comprises a correspondence between the information about the first service and the ID of the logical device.

12. The gateway device according to claim 8, wherein the processor is configured to execute the instructions to:

send the identity authentication information, the ID of the logical device, and the IDs of the N user equipment devices to an authentication server; and receive the authentication result from the authentication server.

13. The gateway device according to claim 12, wherein the processor is configured to execute the instructions to send the correspondence to the logical device corresponding to the ID of the logical device.

14. The gateway device according to claim 8, wherein the processor is configured to execute the instructions to:
generate the ID of the logical device based on the information about the first service and a preset algorithm.

\* \* \* \* \*